United States Patent [19]

Simon et al.

[11] Patent Number: 4,994,000
[45] Date of Patent: Feb. 19, 1991

[54] POWER TRANSMISSION BELT OF THE TRAPEZOIDAL TYPE

[75] Inventors: Jean-Michel Simon, Clamart; Victor Zarife, St. Germain-des-Pres, both of France

[73] Assignee: Hutchinson, Paris, France

[21] Appl. No.: 432,689

[22] Filed: Nov. 7, 1989

[30] Foreign Application Priority Data

Nov. 7, 1988 [FR] France ................................. 88 14484

[51] Int. Cl.$^5$ ................................................. F16G 5/06
[52] U.S. Cl. ........................................ 474/265; 474/268
[58] Field of Search ............... 474/260, 263, 265, 268, 474/270, 271

[56] References Cited

U.S. PATENT DOCUMENTS

| 2,065,180 | 12/1936 | Freelander | 474/265 X |
| 2,124,668 | 7/1938 | Freelander | 474/265 X |
| 2,430,505 | 11/1947 | Freelander et al. | 474/265 X |
| 2,514,429 | 7/1950 | Waugh | 474/265 X |
| 3,485,707 | 12/1969 | Spicer | 474/265 X |
| 3,968,703 | 7/1976 | Bellman | 474/265 X |
| 4,493,681 | 1/1985 | Takano | 474/268 X |
| 4,708,703 | 11/1987 | Macchiarulo et al. | 474/263 X |

FOREIGN PATENT DOCUMENTS

| 022637 | 5/1987 | European Pat. Off. . |
| 152480 | 5/1967 | France . |
| 2547005 | 6/1984 | France . |
| 56-14642 | 12/1981 | Japan . |

Primary Examiner—Thuy M. Bui
Attorney, Agent, or Firm—Browdy and Neimark

[57] ABSTRACT

A power transmission belt of the trapdezoidal type comprising a body made of an elastomer matrix having a layer of cord embedded therein, the cord being made of synthetic or natural textile material and serving as a traction strength member, the belt also including reinforcing members based on fibers extending substantially transversely relative to the belt. The reinforcing members (28) are rigid composite pins made of glass fibers coated in epoxy resin and they are disposed in the outside or back portion only of the belt, which portion is delimited by two side faces (22, 23) that are set back to avoid any contact between the reinforcing members and the cheeks (12, 13) of pulleys (11) with which the belt may cooperate.

6 Claims, 1 Drawing Sheet

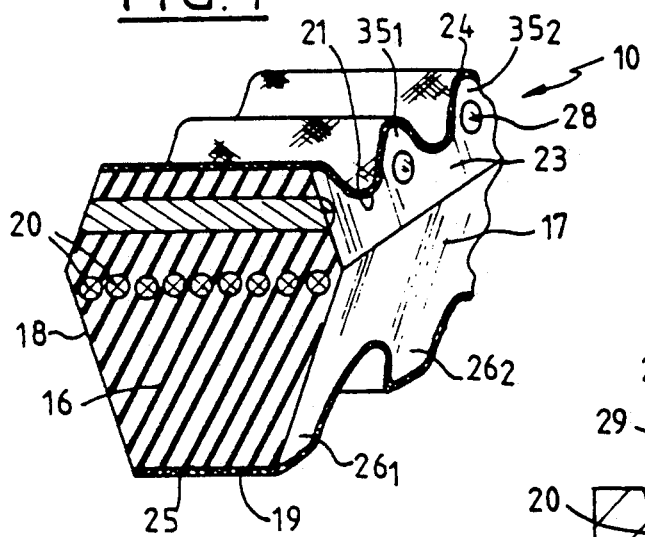
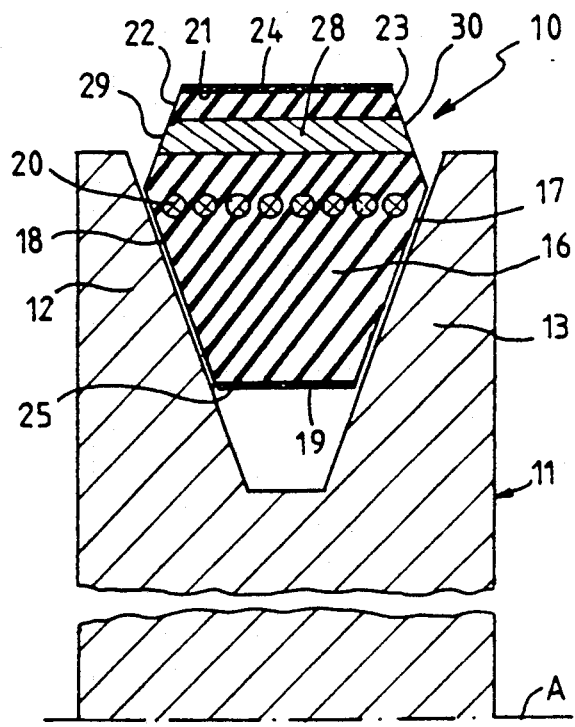
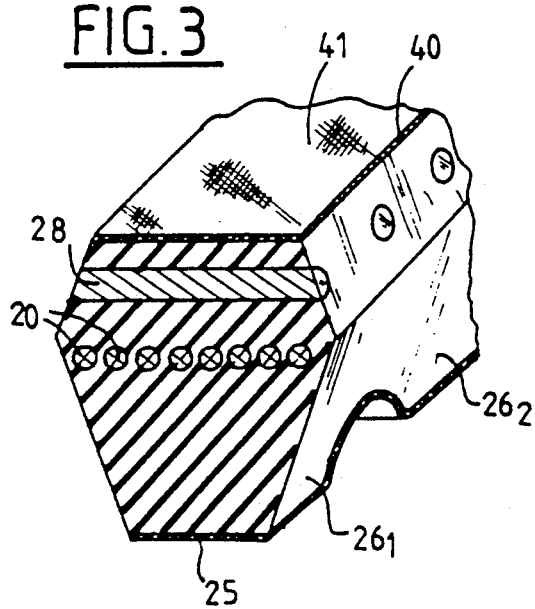
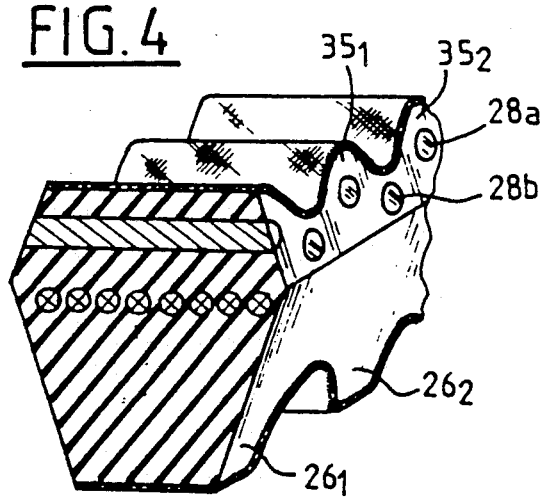

POWER TRANSMISSION BELT OF THE TRAPEZOIDAL TYPE

The invention relates to a power transmission belt of the trapezoidal type.

The invention relates in particular to such a belt having bare flanks and suitable for being used as a member for transmitting a high level of power, e.g. in gear box assemblies or variable transmissions for motor vehicles.

BACKGROUND OF THE INVENTION

Belts used in this type of application (which include transverse teeth on their inside faces when the special flexibility characteristics of belts are required or in certain applications requiring small winding diameters) must be capable of supporting different stress states over long periods of time, must have a high value modulus of elasticity in traction, a low value modulus of elasticity in bending, and a high value of transverse mechanical strength. This last condition is particularly important given that in the absence of adequate transverse stiffness the belt may curve in operation with its right cross-section warping under pressure from the cheeks of the pulleys with which it co-operates, thereby ceasing to transmit power. In order to avoid this drawback, proposals have already been made to increase the transverse stiffness of such belts, for example by adding short fibers uniformly dispersed through the rubber mixture constituting the matrix of the belt, with the fibers being mostly oriented in the transverse direction of the belt, thereby obtaining an anisotropic mixture having a higher value modulus in the transverse direction than in the longitudinal or radial direction. However, in such a solution the degree of transverse stiffness which can be obtained is limited by the fact that the fraction of natural or synthetic short fibers may not exceed about 30% by volume since beyond that value cohesion is rapidly lost between the rubber matrix and the fibers.

Other proposals have also been made for increasing the transverse stiffness of such belts, and in particular, European patent application EP-A-0 109 990 proposes inserting reinforcement constituted by filamentary elements extending substantially across the entire width of the belt on either side of its longitudinal strength member (or cord), i.e. both in the portion of the belt which operates in compression (the inside) and the portion which operates in traction (the outside). In this way, the belt obtains the transverse stiffness required for good compression performance, however this is to the detriment of its longitudinal flexibility which is essential for enabling it to withstand the bending to which it is subjected in operation without being damaged, i.e. without rupturing cohesion at the interface between the reinforcement and the elastomer matrix. In addition, increasing the amount of reinforcement increases cost and also increases difficulty of manufacture, while simultaneously causing contact between the flanks of the belt and the cheeks of the pulleys to create non-uniform zones having very different physical characteristics, particularly with respect to their coefficients of friction. Such differences in coefficients of friction interfere with transmission and set up zones of localized heating which damage the elastomer constituting the matrix, in particular by causing it to crack with the result that cohesion of the assembly is substantially reduced and consequently the characteristics and the lifetimes of such belts are also reduced.

On the basis of this state of the art, the Applicants have sought to provide a belt of the type mentioned above, i.e. in which transverse stiffness is obtained by means of reinforcement based on filaments, but which avoids the drawbacks of known prior art belts.

A particular object of the invention is to provide such a belt for transmitting high power without degrading the longitudinal flexibility of the belt.

Another object of the invention is to provide such a belt whose lifetime is at least as long, if not longer, than that of previously known belts.

Another object of the invention is to provide such a belt which can be manufactured without difficulty in substantially the same way as prior belts, thereby avoiding the need to create special high cost tools and/or apparatuses.

SUMMARY OF THE INVENTION

The present invention provides a power transmission belt of the trapezoidal type comprising a body made of an elastomer matrix having a layer of cord embedded therein, the cord being made of synthetic or natural textile material and serving as a traction strength member, the belt also including reinforcing members based on fibers extending substantially transversely relative to the belt, wherein said reinforcing members are rigid composite pins made of glass fibers coated in epoxy resin and they are disposed in the outside or back portion only of the belt, said portion being delimited by two side faces which are set back to avoid any contact between said reinforcing members and the cheeks of pulleys with which the belt may cooperate.

The reinforcing members or pins advantageously have a diameter lying in the range 0.5 mm to 3 mm and they are placed in the outside or back of the belt in such a manner as to leave sufficient thickness of elastomer material to avoid damaging the mechanical cohesion of the matrix.

The matrix is advantageously constituted by a mixture of rubber having short fibers embedded therein, and in order to prevent such fibers from being apparent and causing microcracks to propagate, the outside face and the inside face of the belt are preferably each covered in cloth of the type used for such belts, i.e. a rubberized cloth having one or two plys based on cotton and/or other natural fibers and/or synthetic fibers.

In a preferred embodiment, the inside portion of the belt, i.e. the portion which is closer to the axes of the pulleys with which the belt co-operates than the cord layer of the belt, is shaped to have transverse teeth or notches.

In order to increase the flexibility of the belt further, and in particular in order to enable the belt to be wound around small diameter pulleys, the invention also provides for transverse teeth or notches to be provided on the outside or back of the belt, i.e. the portion of the belt which operates in traction and which faces outwards relative to the cord layer which substantially occupies the neutral axis of the belt.

Such a disposition also reduces the bending stresses which could otherwise result from the back being too thick.

Although the rigid pins made of epoxy-coated glass fiber occupy only the outside or back portion of the belt, they may be laid in one or more layers. If there are several layers, the pins in one layer are advantageously offset relative to the pins in the next layer, and so on in a somewhat interdigitatized configuration.

BRIEF DESCRIPTION OF THE DRAWING

Embodiments of the invention are described by way of example with reference to the accompanying drawing, in which:

FIG. 1 is a fragmentary perspective view, partially in section through a first embodiment of a belt in accordance with the invention.

FIG. 2 is a cross-section through the belt of FIG. 1 and a pulley with which it is co-operating;

FIG. 3 is a view analogous to FIG. 1, but showing a variant embodiment; and

FIG. 4 is a view analogous to FIG. 1, but showing yet another belt.

DETAILED DESCRIPTION

A bare-flanked trapezoidal type belt 10 in accordance with the invention is provided as a power transmission member between a driving member and a driven member, one and/or both of which is constituted by a respective pulley 11 about an axis A and has cheeks 12 and 13. The cheeks may be fixed or mobile in translation and the pulleys may belong to a mechanical assembly such as a gear box or a variable transmission suitable for use in the motor industry.

In the embodiment shown in FIGS. 1 and 2, the belt 10 comprises a matrix 16 of elastomer material such as synthetic rubber, e.g. polychloroprene in which short fibers are embedded, the fibers being of the aramide type, glass fibers, or cellulose fibers and being intended to increase the strength of the belt in lateral compression. Both FIGS. 1 and 2 show the right cross-section of the belt having bare flanks 17 and 18, and this section has a hexagonal outline resulting from two isosceles trapeziums being placed together base-to-base, with one of the trapeziums delimiting the inside portion of the belt and the other the outside portion or "back" thereof. More precisely, the inside portion (the portion closer to the axis A in use) extends between the flanks 17 and 18, the inside face 19, and a cord layer 20 serving as a traction strength member and constituted, for example, from fibers made of synthetic material such as polyester, aramide, glass, or rayon. The back of the belt extends between said cord layer 20, the outside face 21, and two set-back side faces 22 and 23.

The outside face 21 is provided with one or more layers of rubberized cloth 24, e.g. based on polychloroprene-coated cotton, and the inside face 19 is also covered with rubberized cloth 25 analogous to the cloth 24 and serving to prevent fatigue microcracks from appearing or propagating due to the fiber fill in the matrix 16.

In the embodiment shown in FIG. 1, the inside portion of the belt is cut into teeth $26_1$, $26_2$, . . . , etc. which make it flexible and enable it to wind over small diameter pulleys 11.

Whether or not the inside portion is toothed, the invention provides for imparting the transverse stiffness required by the belt for proper operation while transmitting the desired amount of power. The stiffness is imparted by means of reinforcement members 28 constituted by rigid pins of composite material based on glass fibers embedded in epoxy resin and disposed in the back of the belt only, and transversely relative thereto.

The pins 28 advantageously have a diameter lying in the range 0.5 mm to 3 mm and they are preferably regularly spaced apart in the longitudinal direction of the belt with their individual lengths being substantially equal to the width of the back of the belt, such that the longitudinal ends 29 and 30 of said pins lie flush with respective side faces 22 and 23 of the back of the belts, as can be seen in FIG. 2.

Because said faces are set back, no contact occurs between the pins 28 and the cheeks 12 and 13, in spite of the natural tendency of the belt to "squeeze" into pulleys under the effect of the tension in the cords 20, thereby practically eliminating any possible cause of matrix cracking due to the pins.

In addition, by virtue of the pins being made of epoxy resin coated glass fibers, they can be caused to adhere strongly to the rubber matrix while still conferring good mechanical and thermal characteristics to the belt as are essential for reliable operation without trouble at operating temperature which may be about 120° C.

In the embodiment shown in FIG. 1, the back of the belt is cut transversely to form teeth $35_1$, $35_2$, . . . , etc. and the pins 28 are regularly disposed in the teeth 35, either at one pin per tooth, or else at a different pitch selected as a function of the nominal length of the belt 10.

In the embodiment shown in FIG. 3, the rigid pins 28 are similarly regularly disposed in a layer embedded in the back of the belt, but the back face 40 of the belt no longer has teeth, although it is still covered in cloth 41.

In the embodiment shown in FIG. 4, the back of the belt has teeth as in the embodiment shown in FIG. 1, but the rigid pins 28 are now disposed in the back in two different layers, with the pins 28a in one of the layers being offset longitudinally and radially relative to the pins 28b in the other layer, thereby establishing a somewhat interdigitated configuration.

Good results have been obtained for transmitting a power of 15 kW using rigid reinforcing members 28 as defined and sold by the firm Cousin Freres at Wervicq (France) under the name "Jonc JT".

For the power mentioned above, the lifetime of a belt in accordance with the invention is about 350 hours whereas the lifetime of a comparable conventional belt is only 75 hours.

A belt of the invention is manufactured in a manner analogous to a conventional belt, i.e. by making a sleeve on a mandrel and cutting said sleeve by means of tools which approach it at an angle of incidence of +13° for example, in order to give the flanks of the belt the desired angle of 26°, and also in order to set back the side faces of the back. In such manufacture, a fine layer of elastomer is disposed on the mandrel or else a first layer of rubberized cloth is disposed thereon, after which subsequent layers of elastomer are applied, followed by the cord layer, further layers of elastomer, then the rigid pins, further elastomer, and finally the rubberized cloth forming the outside face of the belt, with the assembly then being vulcanized and finally being cut up.

We claim:

1. A power transmission belt of the trapezoidal type comprising a body made of an elastomer matrix having a layer of cord embedded therein, the cord being made of synthetic or natural textile material and serving as a traction strength member, the belt also including reinforcing members based on fibers extending substantially transversely relative to the belt, wherein said reinforcing members are rigid composite pins made of glass fibers coated in epoxy resin and they are disposed in an outside or back portion only of the belt, said portion being delimited by two side faces which are set back to avoid any contact between said reinforcing members and the cheeks of pulleys with which the belt is adapted to co-operate.

2. A belt according to claim 1, wherein the pins have a diameter lying in the range 0.5 mm to 3 mm and are disposed along the back of the belt in one or more layers.

3. A belt according to claim 1, wherein the matrix contains short fibers for increasing its resistance to lateral compression forces, and wherein its outside face and its inside face are each coated with at least one layer of rubberized cloth.

4. A belt according to claim 1, wherein the length of the reinforcing members is substantially equal to the width of the back of the belt measured between its side faces.

5. A belt according to claim 1, having transverse notching in its inside portion.

6. A belt according to claim 1, having transverse notching in its back portion.

* * * * *